United States Patent
Liao (10) Patent No.: US 9,821,623 B1
(45) Date of Patent: Nov. 21, 2017

(54) ADJUSTABLE SHOCK ABSORBER

(71) Applicant: Chih-Hsien Liao, Taichung (TW)

(72) Inventor: Chih-Hsien Liao, Taichung (TW)

( * ) Notice: Subject to any disclaimer, the term of this patent is extended or adjusted under 35 U.S.C. 154(b) by 25 days.

(21) Appl. No.: 15/207,092

(22) Filed: Jul. 11, 2016

(51) Int. Cl.
*F16F 9/50* (2006.01)
*F16F 9/48* (2006.01)
*B60G 17/08* (2006.01)
*B60G 15/06* (2006.01)

(52) U.S. Cl.
CPC ........... *B60G 17/08* (2013.01); *B60G 15/062* (2013.01); *B60G 2500/11* (2013.01); *B60G 2800/162* (2013.01)

(58) Field of Classification Search
CPC .. F16F 9/096; F16F 9/504; F16F 9/185; F16F 9/064; F16F 9/49; F16F 9/512; F16F 9/20; F16F 9/46; F16F 9/3264; F16F 9/18; F16F 9/44; F16F 9/466; F16F 2222/025; F16F 2230/08; F16F 2230/32; F16F 2228/066; B25B 27/0035; B25B 13/48; B25B 13/50; B60G 13/06; B60G 17/08; B60G 2202/24; B60G 2204/61; B60G 2500/10
USPC ........ 188/314, 309, 310, 318, 322.13, 322.2
See application file for complete search history.

(56) References Cited

U.S. PATENT DOCUMENTS

| | | | | |
|---|---|---|---|---|
| 4,732,244 A | * | 3/1988 | Verkuylen | F16F 9/446 137/493.8 |
| 5,351,790 A | * | 10/1994 | Machida | B60G 13/003 188/266.2 |
| 2007/0252349 A1 | * | 11/2007 | Noguchi | F16F 9/44 280/5.5 |
| 2010/0018818 A1 | * | 1/2010 | Ishii | F16F 9/466 188/319.1 |
| 2011/0017559 A1 | * | 1/2011 | Sintorn | B60G 13/08 188/314 |
| 2012/0205206 A1 | * | 8/2012 | Chen | F16F 9/096 188/269 |
| 2015/0158364 A1 | * | 6/2015 | King | B60G 17/08 188/314 |
| 2015/0290991 A1 | * | 10/2015 | Cox | B60G 13/06 188/269 |

* cited by examiner

*Primary Examiner* — Robert A Siconolfi
*Assistant Examiner* — San Aung
(74) *Attorney, Agent, or Firm* — DLA Piper LLP (US)

(57) ABSTRACT

An adjustable shock absorber includes a base unit, a primary cylinder, a shock rod, a main piston, a biasing member, a hydraulic adjusting unit, a secondary cylinder, a floating piston, a valve module, and a micro-adjusting unit. When an impact force is exerted on the shock rod against a biasing force of the biasing member to force a working liquid to flow from a primary chamber into a liquid sub-chamber of the secondary cylinder, a working gas in a gas sub-chamber of the secondary cylinder is compressed to generate a damping force to act on the working liquid so as to permit the working liquid to flow back to the primary chamber. The damping force can be adjusted by adjusting a needle valve of the micro-adjusting unit.

19 Claims, 8 Drawing Sheets

ADJUSTABLE SHOCK ABSORBER

FIELD

The disclosure relates to an adjustable shock absorber, more particularly to an adjustable shock absorber with three needle valves.

BACKGROUND

Figure 1:
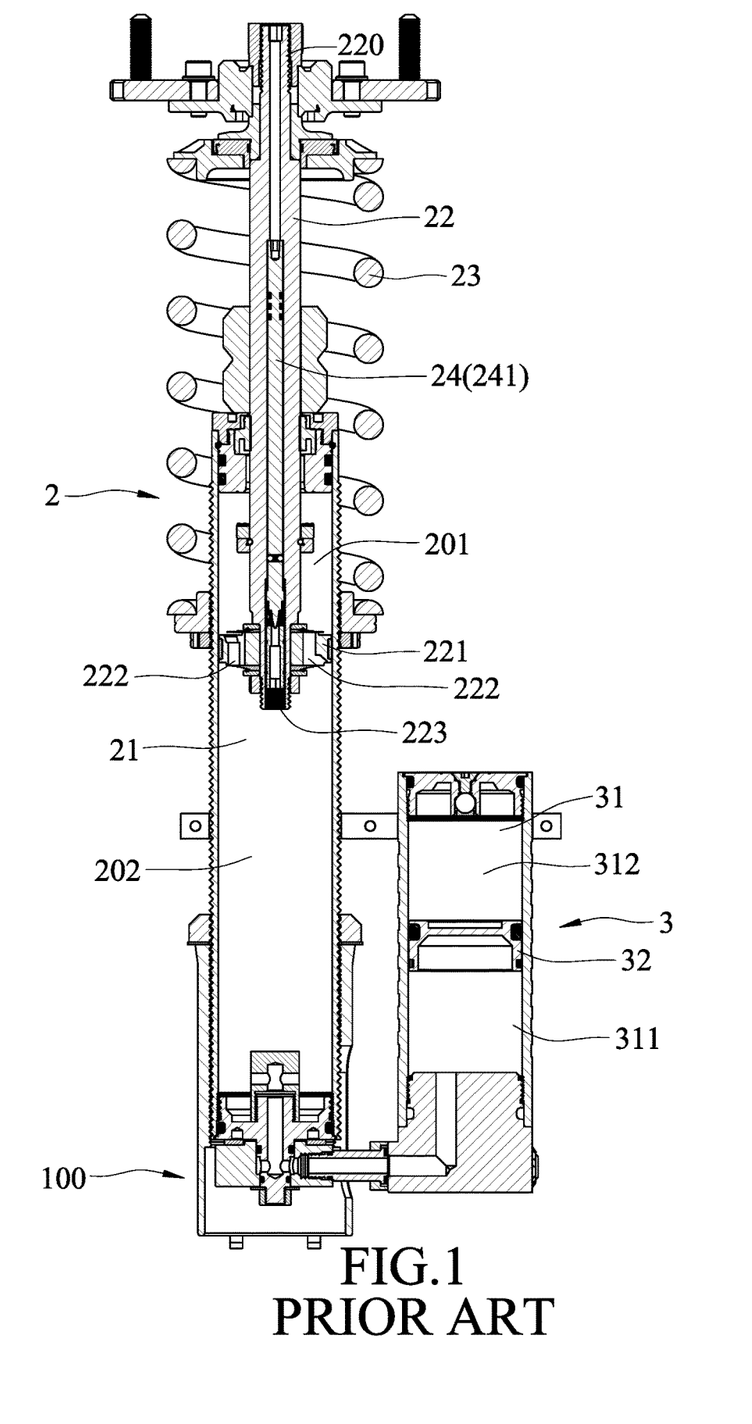
FIG. 1 is a cross-sectional view of a conventional shock absorber.
Figure 2:
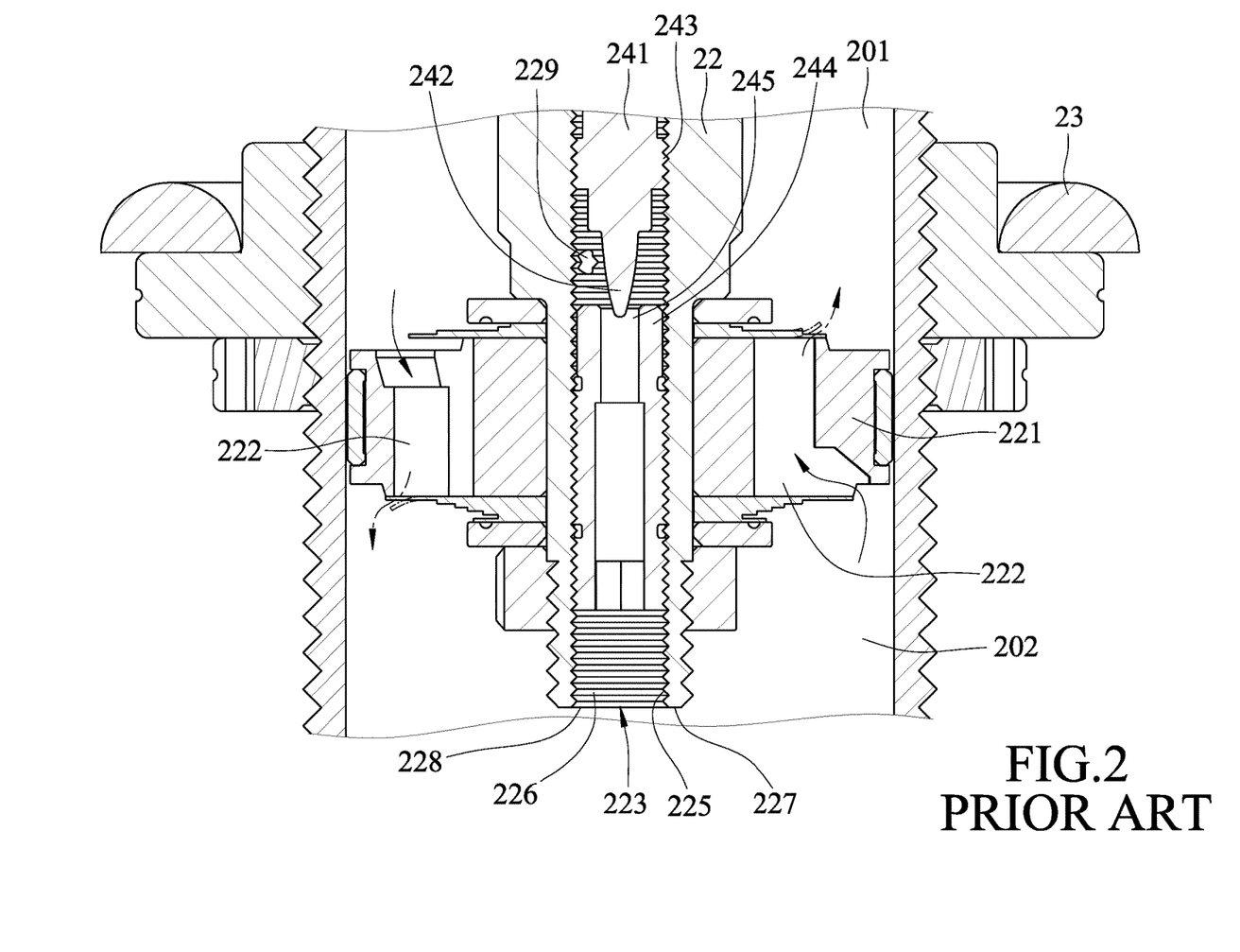
FIG. 2 is a partial enlarged view of FIG. 1.

With reference to FIGS. 1 and 2, a conventional shock absorber is shown to include a base unit 100, a primary cylinder 2, a hollow shock rod 22, a main piston 221, a biasing member 23, a hydraulic adjusting unit 24, a secondary cylinder 3, and a floating piston 32. The main piston 221 is connected to the hollow shock rod 22, and is slidably disposed in a primary chamber 21 of the primary cylinder 2 to divide the primary chamber 21 into two sub-chambers 201, 202. The main piston 221 has two first passageways 222 and a second passageway 223, each interconnecting the two sub-chambers 201, 202. The biasing member 23 is a biasing spring and is disposed to bias an impact side end 220 of the hollow shock rod 22 away from the primary cylinder 2. The hydraulic adjusting unit 24 has an inner rod 241 which is movably and rotatably engaged inside the hollow shock rod 22, and which is configured to be moved relative to the hollow shock rod 22, thereby adjusting flowing of a working liquid passing through the secondary passageway 223. The floating piston 32 is disposed slidably in a secondary chamber 31 of the secondary cylinder 3 to divide the secondary chamber 31 into a liquid sub-chamber 311 and a gas sub-chamber 312. When an impact force is exerted on the hollow shock rod 22 against a biasing force of the biasing member 23 to force the working liquid in the primary chamber 21 to flow into the liquid sub-chamber 311, a working gas in the gas sub-chamber 312 is compressed to generate a damping force to act on the working liquid so as to permit the working liquid in the liquid sub-chamber 311 to flow back to the primary chamber 21. The damping characteristic inside the primary cylinder 2 can be adjusted by the hydraulic adjusting unit 24. However, the damping characteristic inside the secondary cylinder 3 is fixed and cannot be adjusted. Therefore, it is difficult for a car driver to adjust the damping force of the conventional shock absorber based on different road surface conditions.

SUMMARY

Therefore, an object of the disclosure is to provide a novel adjustable shock absorber in which the damping characteristics inside primary and secondary cylinders can be adjusted.

According to a first aspect of the disclosure, an adjustable shock absorber includes a base unit, a primary cylinder, a hollow shock rod, a main piston, a biasing member, a hydraulic adjusting unit, a secondary cylinder, a floating piston, a valve module, and a micro-adjusting unit. The base unit has a main channel, a first connecting channel, and a second connecting channel. The main channel has a first port and a second port opposite to the first port. Each of the first and second connecting channels is in fluid communication with the second port and being configured to permit a working fluid to flow toward and away from the main channel. The primary cylinder defining a primary chamber for accommodating the working fluid, the first port being located inside the primary chamber. The hollow shock rod has an impact side end disposed outwardly of the primary cylinder and an inner end disposed in the primary chamber. The main piston is disposed on the hollow shock rod proximate to the inner end, is slidably disposed in the primary chamber to divide the primary chamber into two sub-chambers, and has at least one first passageway and a second passageway. Each of the first and second passageways interconnects the two sub-chambers of the primary chamber so as to permit the working fluid to flow between the two sub-chambers of the primary chamber. The biasing member is disposed to bias the impact side end away from the primary cylinder. The hydraulic adjusting unit includes an inner rod which is movably and rotatably engaged inside the hollow shock rod, and which is configured to be moved relative to the hollow shock rod, thereby adjusting flowing of the working fluid passing through the second passageway. The secondary cylinder defines a secondary chamber. The floating piston is disposed slidably in the secondary chamber to divide the secondary chamber into a liquid sub-chamber and a gas sub-chamber for accommodating the working fluid and a working gas, respectively. The liquid sub-chamber is in fluid communication with the main channel. The valve module is disposed between the main channel and the floating piston, and is configured to permit the working fluid to flow between the main channel and the liquid sub-chamber. The micro-adjusting unit has a first plunger and a second plunger which are movably and rotatably engaged in the base unit to adjust flowing of the working fluid passing through a corresponding one of the first and second connecting channels.

According to a second aspect of the disclosure, an adjustable shock absorber includes a primary cylinder, a main piston, a shock rod, an upper mounting seat, a lower mounting seat, a biasing member, a base, a base extension, a valve module, a second cylinder, a floating piston, and a first needle valve. The primary cylinder defines a primary chamber for accommodating a working liquid and has an upper end segment and a lower end segment. The lower end segment has an outlet port. The main piston is slidably disposed in the primary chamber to divide the primary chamber into an upper sub-chamber and a lower sub-chamber that are proximate to the upper and lower end segments, respectively. The main piston has a passageway interconnecting the upper and lower sub-chambers. The shock rod is connected to the main piston and extends outwardly of the primary cylinder to terminate at an impact side end. The upper mounting seat is mounted on the shock rod adjacent to the impact side end. The lower mounting seat is mounted on the primary cylinder proximate to the upper end segment. The biasing member is disposed between the upper and lower mounting seats to bias the impact side end away from the upper end segment. The base has an inlet port disposed to be in fluid communication with the outlet port, and a first bore disposed downstream of the inlet port when the working liquid is forced by the main piston to flow out of the outlet port. The first bore has a first inner peripheral surface with a first female threaded region. The base extension extends from the base to terminate at an end surface which has a central region and a circumferential region. The base extension has a socket cavity, a first internal port, and a first duct. The socket cavity extends inwardly from the central region of the end surface, and is in fluid communication with the inlet port. The first internal port is formed in the circumferential region of the end surface. The first duct extends from the first internal port toward the base to be in fluid communication with the first bore. The valve module includes a module body, a check ball, and a check diaphragm. The module body is fittingly engaged in the socket cavity, and defines therein a flow-in passage and at least one flow-out passage. The flow-in and flow-out passages extend toward the base to be in fluid communication with the inlet port, and extend away from the base to terminate at a communication port and an outer valve port, respectively. The module body has an inner valve seat and at least one outer valve seat. The inner valve seat is disposed in the flow-in passage and defines an inner valve port disposed to fluidly communicate the inlet port with the communication port. The inner valve port defines a port axis. The at least one outer valve seat defines the outer valve port which is disposed radially offset from the port axis. The check ball is disposed in the flow-in passage, and is configured to couple with the inner valve seat to permit a unidirectional flow of the working liquid into the flow-in passage through the communication port. The check diaphragm is configured to couple with the outer valve seat to permit a unidirectional flow of the working liquid out of the flow-out passage through the outer valve port. The secondary cylinder defines a secondary chamber and has an open end and a closed end. The open end is configured to permit the base extension to be fitted into and in liquid tight engagement with the open end. The floating piston is disposed slidably in the secondary chamber to divide the secondary chamber into a liquid sub-chamber and a gas sub-chamber for accommodating the working liquid and a working gas, respectively. The liquid sub-chamber and the gas sub-chamber are arranged such that when an impact force is exerted on the shock rod against a biasing force of the biasing member to force the working liquid to flow into the liquid sub-chamber, the working gas in the gas sub-chamber is compressed to generate a damping force to act on the working liquid so as to permit the working liquid in the liquid sub-chamber to flow back to the primary chamber through the communication port. The first needle valve is disposed in the first bore, and has a first valve seat and a first plunger. The first valve seat defines a first valve port which is disposed to fluidly communicate the inlet port and the first duct. The first plunger has a first needle segment and a first male threaded segment which is opposite to the first needle segment, and which is configured to be movably and threadedly engaged with the first female threaded region of the first bore such that the first needle segment is displaceable toward or away from the first valve seat so as to adjust the damping force.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Before the disclosure is described in greater detail, it should be noted that like elements are denoted by the same reference numerals throughout the specification.

Figure 3:
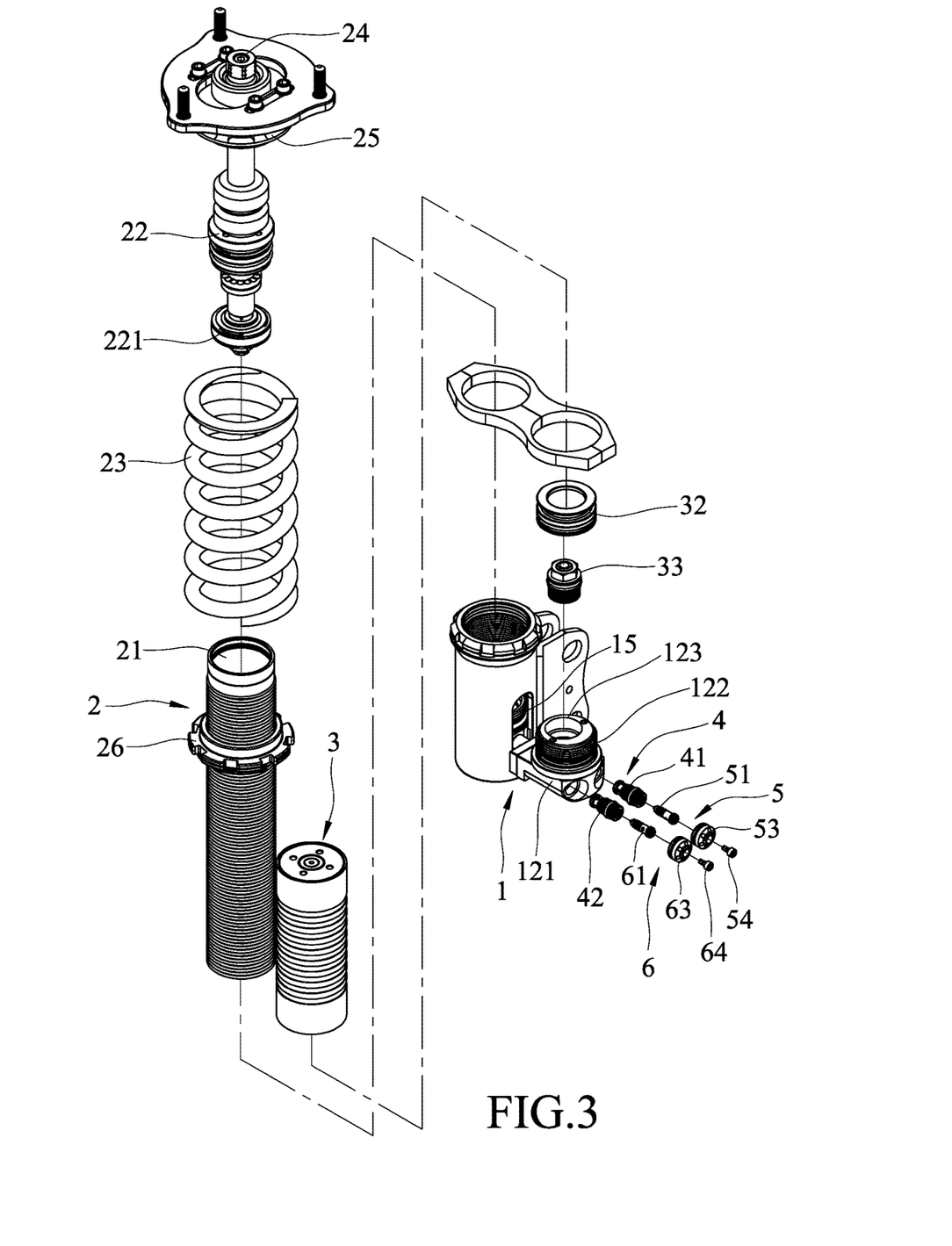
FIG. 3 is an exploded perspective view of an adjustable shock absorber according to an embodiment of the disclosure.
Figure 4:
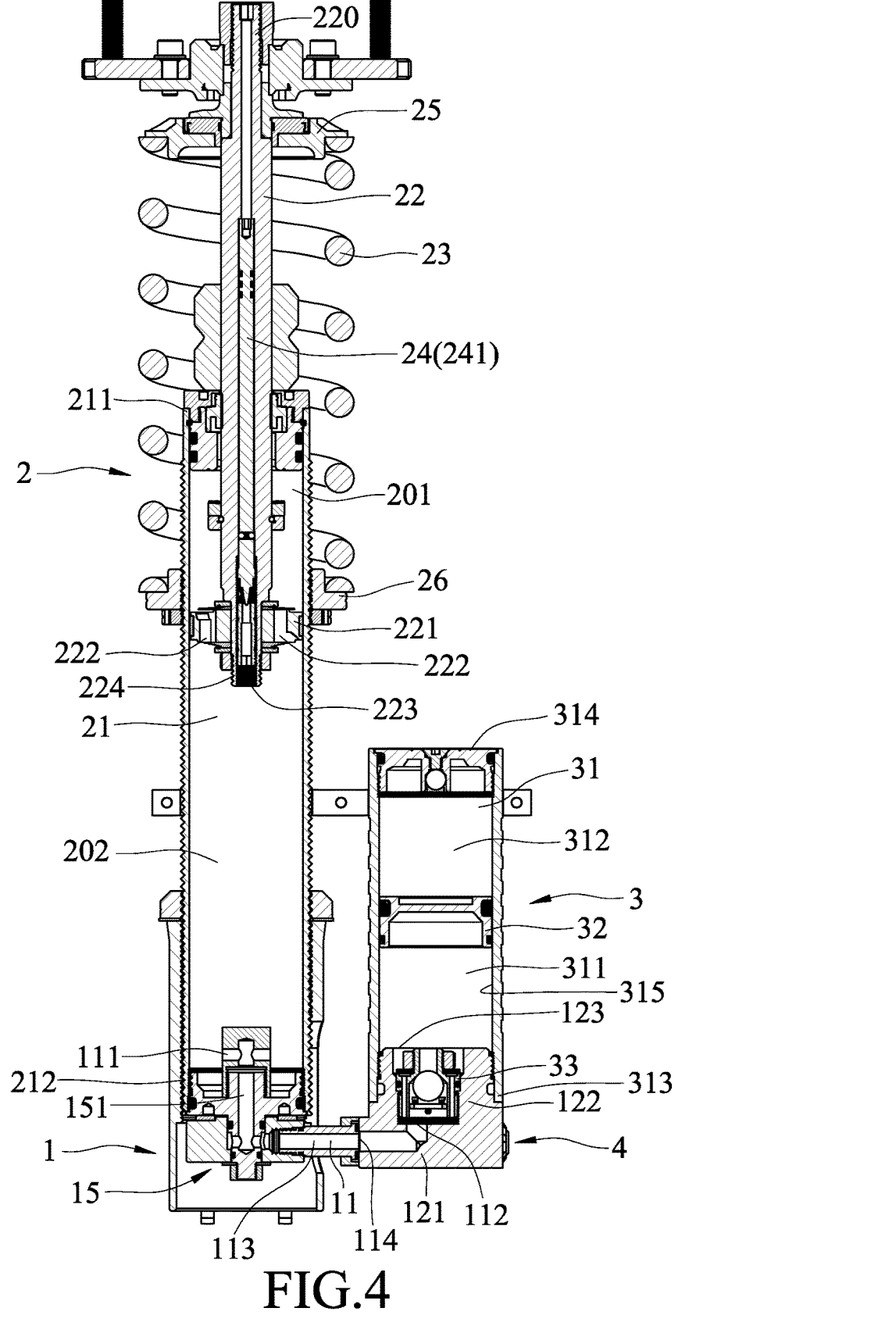
FIG. 4 is a cross-sectional view of the adjustable shock absorber according to the embodiment of the disclosure.
Figure 5:
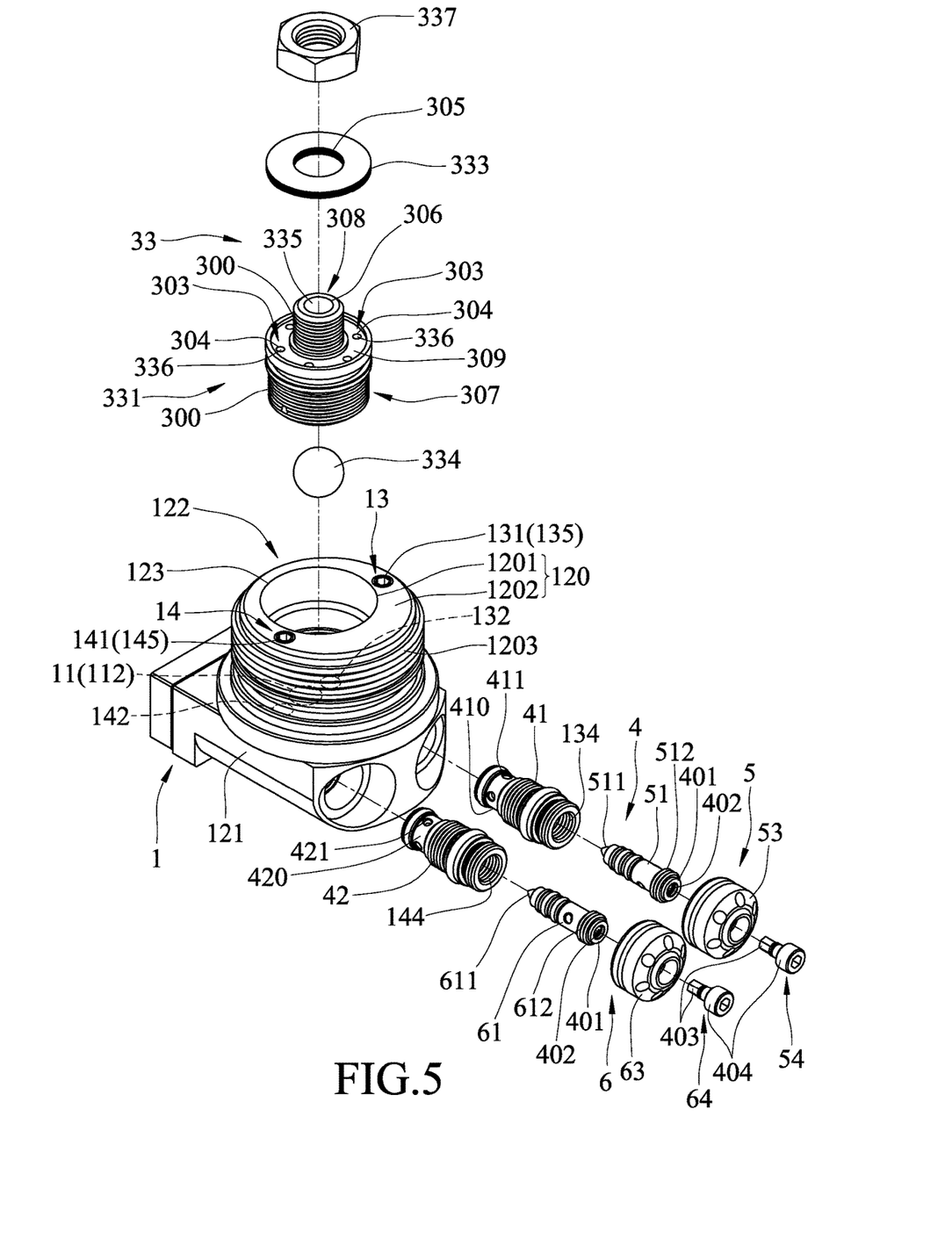
FIG. 5 is an exploded perspective view illustrating a valve module, a base, a base extension, and a micro-adjusting unit of the adjustable shock absorber according to the embodiment of the disclosure.

With reference to FIGS. 3 to 5, an adjustable shock absorber according to an embodiment of the disclosure includes a base unit 1, a primary cylinder 2, a secondary cylinder 3, a micro-adjusting unit 4, a shock rod 22, a main piston 221, a biasing member 23, a hydraulic adjusting unit 24, an upper mounting seat 25, a lower mounting seat 26, a floating piston 32, and a valve module 33.

The primary cylinder 2 defines therein a primary chamber 21 for accommodating a working fluid (a working liquid), and has an upper end segment 211 and a lower end segment 212. The lower end segment 212 has an outlet port 113. In this embodiment, the working liquid is oil.

The main piston 221 is slidably disposed in the primary chamber 21 to divide the primary chamber 21 into an upper sub-chamber 201 and a lower sub-chamber 202 which are proximate to the upper and lower end segments 211, 212, respectively. The main piston 221 has at least one first passageway 222 interconnecting the upper and lower sub-chambers 201, 202 so as to permit the working liquid to flow between the upper and lower sub-chambers 201, 202. In this embodiment, the main piston 221 has two of the first passageways 222.

The shock rod 22 extends outwardly of the primary cylinder 2 to terminate at an impact side end 220 and has an inner end 224 which is disposed inside the primary chamber 21, and which is connected to the main piston 221.

In this embodiment, as shown in FIGS. 2 and 4, the shock rod 22 is hollow and has an inner peripheral surface 225 with an inner female threaded region 226. The inner peripheral surface 225 extends toward the lower end segment 212 to terminate at a tubular end edge 227 which defines a lower port 228 in fluid communication with the lower sub-chamber 202. The inner peripheral surface 225 has a through hole 229 configured to fluidly communicate the upper sub-chamber 201 and the lower port 228. A secondary passageway 223 is defined between the through hole 229 and the lower port 228.

The upper mounting seat 25 is mounted on the shock rod 22 adjacent to the impact side end 220.

The lower mounting seat 26 is mounted on the primary cylinder 2 proximate to the upper end segment 211.

The biasing member 23 is a biasing spring and is disposed between the upper and lower mounting seats 25, 26 to bias the impact side end 220 away from the upper end segment 211 of the primary cylinder 2.

The base unit 1 includes a base 121 and a base extension 122.

Figure 7:
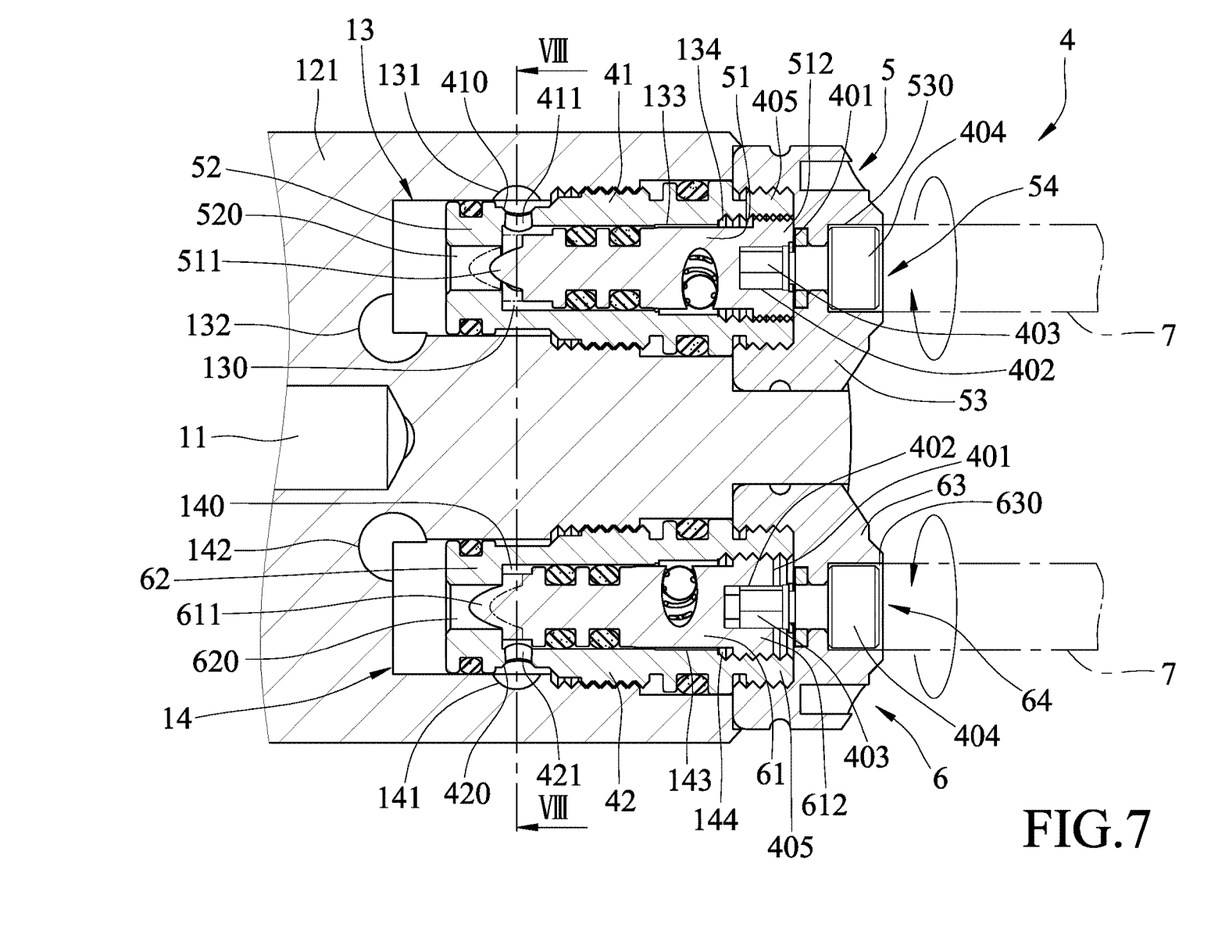
FIG. 7 is a cross-sectional view taken along line VII-VII of FIG. 6.

The base 121 has an inlet port 114 (see FIG. 4) and a first bore 130 (see FIG. 7). The inlet port 114 is disposed to be in fluid communication with the outlet port 113. The first bore 130 is disposed downstream of the inlet port 114 when the working liquid is forced by the main piston 221 to flow out of the outlet port 113. The first bore 130 has a first inner peripheral surface 133 with a first female threaded region 134.

In this embodiment, the base 121 further has a second bore 140 (see FIG. 7) disposed downstream of the inlet port 114 when the working liquid is forced by the main piston 221 to flow out of the outlet port 113. The second bore 140 has a second inner peripheral surface 143 with a second female threaded region 144.

Referring to FIG. 5, it can be seen that the base extension 122 extends from the base 121 to terminate at an end surface 120 which has a central region 1201 and a circumferential region 1202. The base extension 122 has a socket cavity 123, a first internal port 135, and a first duct 131. The socket cavity 123 extends inwardly from the central region 1201 of the end surface 120, and is in fluid communication with the inlet port 114 (see FIG. 4). The first internal port 135 is formed in the circumferential region 1202 of the end surface 120. The first duct 131 extends from the first internal port 135 toward the base 121 to be in fluid communication with the first bore 130 (see FIG. 7).

In this embodiment, as shown in FIG. 5, the base extension 122 further has a second internal port 145 and a second duct 141. The second internal port 145 is formed in the circumferential region 1202 of the end surface 120, and is angularly displaced from the first internal port 135. The second duct 141 extends from the second internal port 145 toward the base 121 to be in fluid communication with the second bore 140 (see FIG. 7).

Figure 8:
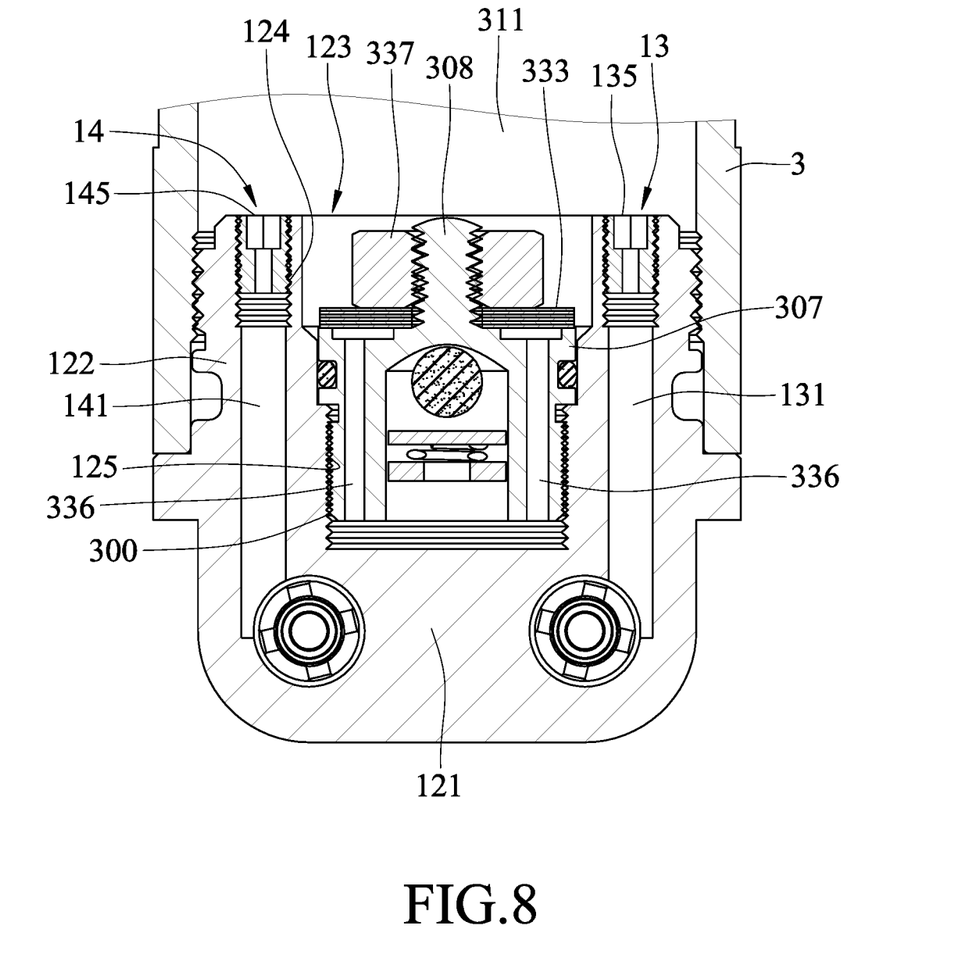
FIG. 8 is a cross-sectional view taken along line VIII-VIII of FIG. 7.

In this embodiment, as shown in FIGS. 5, 7, and 8, the base 121 and the base extension 122 cooperatively define a first connecting channel 13 and a second connecting channel 14. The first connecting channel 13 has the first duct 131, the first bore 130, and a third duct 132. The third duct 132 is disposed to fluidly communicate the first bore 130 with the inlet 114 (see FIG. 4). The second connecting channel 14 has the second duct 141, the second bore 140, and a fourth duct 142. The fourth duct 142 is disposed to fluidly communicate the second bore 140 with the inlet 114.

In this embodiment, as shown in FIG. 4, the base unit 1 further includes a duct body 15 which is disposed in the lower sub-chamber 202, and which has an internal duct 151 and a duct port 111. The internal duct 151 is disposed upstream of the outlet port 113 when the working liquid is forced by the main piston 221 to flow out of the outlet port 113. The duct port 111 is disposed to fluidly communicate the lower sub-chamber 202 with the internal duct 151.

As shown in FIG. 4, the base unit 1 has a main channel 11 extending from a first port (i.e., the duct port 111) through the internal duct 151 to terminate at a second port 112 to permit the working liquid to flow through the outlet port 113 and the inlet port 114. The first port 111 is located inside the primary chamber 21. Referring back to FIGS. 5, 7, and 8, it can be seen that each of the first and second connecting channels 13, 14 is in fluid communication with the second port 112 so as to permit the working liquid to flow from a liquid sub-chamber 311 of the secondary cylinder 3 toward the main channel 11, and to flow from the main channel 11 toward the liquid sub-chamber 311.

As shown in FIG. 4, the valve module 33 is disposed between the inlet 114 and the floating piston 32 and is configured to permit the working liquid to flow between the inlet 114 and the liquid sub-chamber 311.

In this embodiment, as shown in FIG. 5, the valve module 33 includes a module body 331, an elastic member (i.e., a check ball 334), and an elastic steel piece (i.e., a check diaphragm 333).

The module body 331 is fittingly engaged in the socket cavity 123, and defines therein a flow-in passage 335 and at least one flow-out passage 336. The flow-in and flow-out passages 335, 336 extend toward the base 121 to be in fluid communication with the inlet port 114, and extend away from the base 121 to terminate at a communication port 306 and an outer valve port 304, respectively. Each of the flow-in and flow-out passages 335, 336 is disposed to fluidly communicate the liquid sub-chamber 311 with the inlet port 114.

Figure 6:
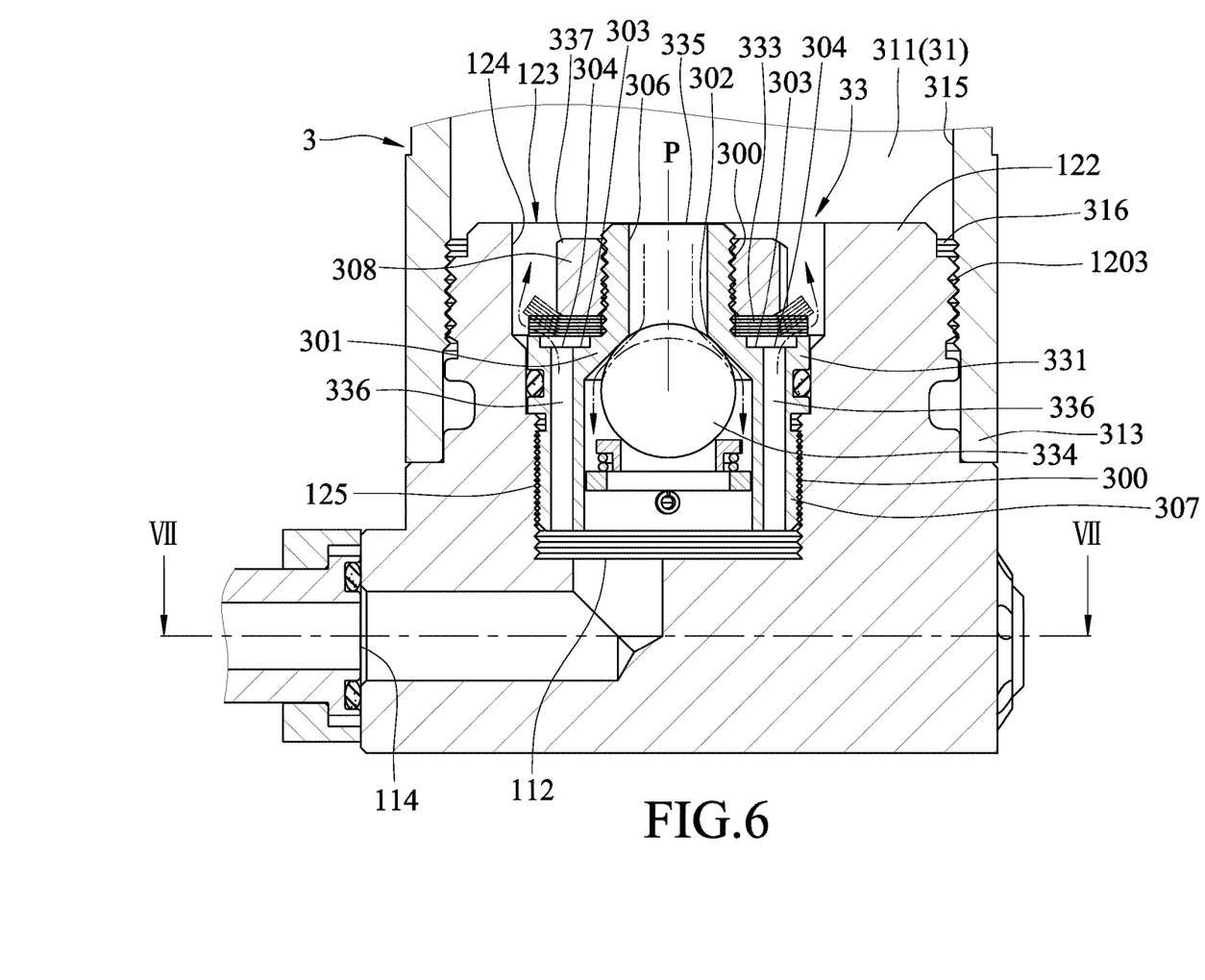
FIG. 6 is a partial enlarged cross-sectional of the adjustable shock absorber according to the embodiment of the disclosure.

As shown in FIG. 6, the module body 331 has an inner valve seat 301 and at least one outer valve seat 303. The inner valve seat 301 is disposed in the flow-in passage 335 and defines an inner valve port 302 disposed to fluidly communicate the inlet port 114 with the communication port 306. The inner valve port 302 defines a port axis (P). The outer valve seat 303 defines the outer valve port 304 which is disposed radially offset from the port axis (P).

The check ball 334 is disposed in the flow-in passage 335, and is configured to couple with the inner valve seat 301 to permit a unidirectional flow of the working liquid from the liquid sub-chamber 311 into the flow-in passage 335 through the communication port 306. In this embodiment, the check ball 334 is disposed to deformably cover the inner valve seat 301.

The check diaphragm 333 is configured to couple with the outer valve seat 303 to permit a unidirectional flow of the working liquid out of the flow-out passage 336 through the outer valve port 304. In this embodiment, the check diaphragm 333 has an inner periphery 305 secured to the module body 331 (see FIG. 5). In this embodiment, the check diaphragm 333 is disposed to deformably cover the outer valve seat 303.

In this embodiment, as shown in FIG. 5, the module body 331 defines a plurality of the flow-out passages 336 each having the outer valve port 304, and has a plurality of the outer valve seats 303 each defining the outer valve port 304. The outer valve ports 304 of the module body 331 are displaced from each other in a circumferential direction. The check diaphragm 333 is configured in a ring shape so as to couple with all the plurality of outer valve seats 303.

In this embodiment, the module body 331 has a large-diameter segment 307, a small diameter segment 308, and a shoulder region 309 which is defined between the large-diameter and small-diameter segments 307, 308, and which has the outer valve seats 303. Each of the large-diameter and small-diameter segments 307, 308 has an outer threaded region 300. The socket cavity 123 has an inner peripheral surface 124 with an inner threaded region 125 which is threadedly engaged with the outer threaded region 300 of the large-diameter segment 307. The small-diameter segment 308 has the communication port 306. The check diaphragm 333 is disposed on the shoulder region 309. The valve module 33 further includes a nut 337 engaged threadedly with the outer threaded region 300 of the small-diameter segment 308 so as to permit the check diaphragm 333 to be brought into coupling engagement with all the plurality of outer valve seats 303.

Referring back to FIG. 4, it can be observed that the secondary cylinder 3 defines a secondary chamber 31 and has an open end 313 and a closed end 314. The open end 313 is configured to permit the base extension 122 to be fitted into and in liquid tight engagement with the open end 313.

In this embodiment, as best shown in FIG. 6, the base extension 122 has an outer threaded surface 1203, and the secondary cylinder 3 has an inner peripheral surface 315 which defines the secondary chamber 31, and which has an inner thread region 316 that is proximate to the open end 313, and that is threadedly engaged with the outer threaded surface 1203 of the base extension 122.

As shown in FIG. 4, the floating piston 32 is disposed slidably in the secondary chamber 31 to divide the secondary chamber 31 into the liquid sub-chamber 311 and a gas sub-chamber 312 for accommodating the working liquid and a working gas, respectively. In this embodiment, the working gas is nitrogen gas. The liquid sub-chamber 311 and the gas sub-chamber 312 are arranged such that when an impact force is exerted on the shock rod 22 against a biasing force of the biasing member 23 to force the working liquid to flow into the liquid sub-chamber 311, the working gas in the gas sub-chamber 312 is compressed to generate a damping force to act on the working liquid so as to permit the working liquid in the liquid sub-chamber 311 to flow back to the primary chamber 21 through the communication port 306.

As shown in FIG. 5, the micro-adjusting unit 4 includes a first plunger 51 and a second plunger 61 which are movably engaged in the base unit 1, and which are configured to permit each of the first and second plungers 51, 61 to be moved relative to the base unit 1 so as to adjust flowing of the working fluid passing through a corresponding one of the first and second connecting channels 13, 14.

In this embodiment, the micro-adjusting unit 4 includes a first needle valve 5 and a second needle valve 6.

As shown in FIGS. 5 and 7, the first needle valve 5 is disposed in the first bore 130 and has a first valve seat 52 and the first plunger 51. The first valve seat 52 defines a first valve port 520 which is disposed to fluidly communicate the inlet port 114 (see FIG. 4) and the first duct 131. The first plunger 51 has a first needle segment 511 and a first male threaded segment 512 which is opposite to the first needle segment 511, and which is configured to be movably and threadedly engaged with the first female threaded region 134 of the first bore 130 such that the first needle segment 511 is displaceable toward or away from the first valve seat 52 so as to adjust the damping force.

The second needle valve 6 is disposed in the second bore 140 and has a second valve seat 62 and the second plunger 61. The second valve seat 62 defines a second valve port 620 which is disposed to fluidly communicate the inlet port 114 (see FIG. 4) and the second duct 141. The second plunger 61 has a second needle segment 611 and a second male threaded segment 612 which is opposite to the second needle segment 611, and which is configured to be movably and threadedly engaged with the second female threaded region 144 of the second bore 140 such that the second needle segment 611 is displaceable toward or away from the second valve seat 62 so as to adjust the damping force.

In this embodiment, the micro-adjusting unit 4 further includes a first valve body 41 and a second valve body 42, which are respectively and threadedly engaged inside the base 121, and which define therein the first and second bores 130, 140, respectively. As shown in FIGS. 5 and 7, the first valve body 41 has an outer surface formed with an annular groove 410, a plurality of first holes 411, and the first valve seat 52. The annular groove 410 is disposed to be in fluid communication with the first duct 131. The first holes 411 are disposed to fluidly communicate the annular groove 410 with the first bore 130. The first valve hole 520 of the first valve seat 52 is disposed to fluidly communicate the first bore 130 with the third duct 132. The second valve body 42 has an outer surface formed with an annular groove 420, a plurality of second holes 421, and the second valve seat 62. The annular groove 420 is disposed to be in fluid communication with the second duct 141. The second holes 421 are disposed to fluidly communicate the annular groove 420 with the second bore 140, and the second valve hole 620 is disposed to fluidly communicate the second bore 140 with the fourth duct 142.

In this embodiment, as shown in FIG. 7, each of the first and second threaded segments 512, 612 has an end region 401 formed with a hex socket 402, and the micro-adjusting unit 4 further has a first drive head 54 and a second drive head 64, each having an insert end 403 and a drive end 404. The insert end 403 of each of the first and second drive heads 54, 64 is configured to be inserted into the hex socket 402 of a corresponding one of the first and second threaded segments 512, 612 so as to permit each of the first and second plungers 51, 61 to rotate with a corresponding one of the first and second drive heads 54, 64. The drive end 404 of the first drive head 54 is configured to be driven by a driving tool 7 to rotate so as to translate rotational movement of the first drive head 54 into linear movement of the first plunger 51 to thereby displace the first needle segment 511. The drive end 404 of the second drive head 64 is configured to be driven by the driving tool 7 to rotate so as to translate rotational movement of the second drive head 64 into linear movement of the second plunger 51 to thereby displace the second needle segment 611. The linear movement of the first plunger 51 in response to the rotational movement of the first drive head 54 is different from the linear movement of the second plunger 61 in response to the rotational movement of the second drive head 64. Therefore, one of the first and second needle valves 5, 6 can be used for coarse adjustment, and the other one of the first and second needle valves 5, 6 can be used for fine adjustment.

To increase a damping ratio in the first and second connecting channels 13, 14 (i.e., to reduce a volumetric flow rate of each of the first and second connecting channels 13, 14), each of the first and second drive heads 54, 64 is rotated in a clockwise direction (see FIG. 7) so as to displace a corresponding one of the first and second needle segments 511, 611 toward a corresponding one of the first and second valve seats 52, 62. When the first and second valve holes 520, 620 are closed by the first and second needle segments 511, 611, respectively, the damping ratio in the first and second connecting channels 13, 14 is the highest.

To reduce a damping ratio in the first and second connecting channels 13, 14 (i.e., to increase a volumetric flow rate of each of the first and second connecting channels 13, 14), each of the first and second drive heads 54, 64 is rotated in a counterclockwise direction (see FIG. 7) so as to displace the corresponding one of the first and second needle segments 511, 611 away from a corresponding one of the first and second valve seats 52, 62. When the first and second valve holes 520, 620 are full open, the damping ratio in the first and second connecting channels 13, 14 is the lowest.

In this embodiment, the micro-adjusting unit 4 further has a first end cap 53 and a second end cap 63, each of which is coupled to an outer end 405 of a corresponding one of the first and second valve bodies 41, 42, and each of which has an access hole 530, 630 configured to permit a corresponding one of the first and second drive heads 54, 64 to be mounted to the corresponding one of the first and second male threaded segments 512, 612.

As shown in FIG. 2, the hydraulic adjusting unit 24 is configured to move relative to the shock rod 22 so as to adjusting flowing of the working liquid passing through the secondary passageway 223. In this embodiment, the hydraulic adjusting unit 24 is an inner needle valve which includes an inner valve seat 244 and an inner rod 241. The inner valve seat 244 is disposed on the inner peripheral surface 225 of the shock rod 22, and defines an inner valve port 245 disposed to fluidly communicate the through hole 229 and the lower port 228. The inner rod 241 has an inner needle segment 242 and an outer male threaded segment 243 which is distal from the inner valve seat 244, and which is configured to be movably and threadedly engaged with the inner female threaded region 226 of the shock rod 22 such that the inner needle segment 242 is displaceable toward or away from the inner valve seat 244 so as to adjust the damping force.

When a car runs on a rough road surface, the adjustable shock absorber can absorb and damp shock impulses, and converts the kinetic energy of the shock into another form of energy (e.g., heat). Because the adjustable shock absorber has the inner needle valve 24 disposed in the primary cylinder 2 and the first and second needle valves 5, 6 disposed in the base unit 1, the damping characteristics in the primary and secondary cylinders 2,3 can be suitably adjusted. Therefore, based on different road surface conditions, a car driver can easily adjust the damping force of the adjustable shock absorber.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An adjustable shock absorber comprising:
   a base unit having a main channel, a first connecting channel, and a second connecting channel, said main channel having a first port and a second port opposite to said first port, each of said first and second connecting channels being in fluid communication with said second port and being configured to permit a working fluid to flow toward and away from said main channel;
   a primary cylinder defining a primary chamber for accommodating the working fluid, said first port being located inside said primary chamber;
   a hollow shock rod having an impact side end disposed outwardly of said primary cylinder and an inner end disposed in said primary chamber;
   a main piston which is disposed on said hollow shock rod proximate to said inner end, which is slidably disposed in said primary chamber to divide said primary chamber into two sub-chambers, and which has at least one first passageway and a second passageway, each of said first and second passageways interconnecting said two sub-chambers of said primary chamber so as to permit the working fluid to flow between said two sub-chambers of said primary chamber;
   a biasing member disposed to bias said impact side end away from said primary cylinder;
   a hydraulic adjusting unit including an inner rod which is movably and rotatably engaged inside said hollow shock rod, and which is configured to be moved relative to said hollow shock rod, thereby adjusting flowing of the working fluid passing through said second passageway;
   a secondary cylinder defining a secondary chamber;
   a floating piston disposed slidably in said secondary chamber to divide said secondary chamber into a liquid sub-chamber and a gas sub-chamber for accommodating the working fluid and a working gas, respectively, said liquid sub-chamber being in fluid communication with said main channel;
   a valve module disposed between said main channel and said floating piston, and configured to permit the working fluid to flow between said main channel and said liquid sub-chamber; and
   a micro-adjusting unit having a first plunger and a second plunger which are movably and rotatably engaged in said base unit to adjust flowing of the working fluid passing through a corresponding one of said first and second connecting channels.

2. The adjustable shock absorber according to claim 1, wherein said valve module includes an elastic steel defining an inner valve port, and a plurality of outer valve seats each defining an outer valve port, said elastic steel piece being disposed to cover said outer valve seats, and being configured to permit a unidirectional flow of the working fluid from said main channel toward said liquid sub-chamber through said outer valve ports of said outer valve seats, said elastic member being disposed to cover said inner valve port to permit a unidirectional flow of the working fluid from said liquid sub-chamber toward said main channel.

3. The adjustable shock absorber according to claim 2, wherein said valve module further includes a module body defining a flow-in passage and a plurality of flow-out passages, each of said flow-in and flow-out passages being disposed to fluidly communicate said liquid sub-chamber with said main channel, said elastic member and said inner valve seat being disposed in said flow-in passage, said outer valve port of each of said outer valve seats being in fluid communication with a corresponding one of said flow-out passages, said elastic steel piece having an inner periphery secured to said module body.

4. The adjustable shock absorber according to claim 3, wherein said elastic member is a check ball, and said elastic steel piece is a check diaphragm.

5. The adjustable shock absorber according to claim 3, wherein said first connecting channel has a first duct, a third duct, and a first bore disposed to fluidly communicate said first duct with said third duct, said second connecting channel having a second duct, a fourth duct, and a second bore disposed to fluidly communicate said second duct with said fourth duct, said first and second plungers being disposed in said first and second bores, respectively.

6. The adjustable shock absorber according to claim 5, wherein said base unit include a base and a base extension, said base having therein said second port and said first and second bores, said base extension extending from said base and having a socket cavity in which said module body is mounted therein, said micro-adjusting unit further having a first valve body and a second valve body which are respectively mounted in said base, and which define therein said first and second bores, respectively, said first valve body having a first hole and a first valve seat with a first valve hole, said first hole being disposed to fluidly communicate said first duct with said first bore, said first valve hole being disposed to fluidly communicate said first bore with said third duct, said second valve body having a second hole and a second valve seat with a second valve hole, said second hole being disposed to fluidly communicate said second duct with said second bore, said second valve hole being disposed to fluidly communicate said second bore with said fourth duct.

7. The adjustable shock absorber according to claim 6, wherein said first bore has a first inner peripheral surface with a first female threaded region, and said second bore has a second inner peripheral surface with a second female threaded region, said first plunger having a first needle segment and a first male threaded segment configured to be movably and threadedly engaged with said first female threaded region such that said first needle segment is displaceable toward or away from said first valve seat so as to adjust flowing of the working fluid passing through said first connecting channel, said second plunger having a second needle segment and a second male threaded segment configured to be movably and threadedly engaged with said second female threaded region such that said second needle segment is displaceable toward or away from said second valve seat so as to adjust flowing of the working fluid passing through said second connecting channel.

8. The adjustable shock absorber according to claim 7, wherein said micro-adjusting unit further has a first drive head and a second drive head which are mounted to said first and second male threaded segments, respectively, said first drive head being configured to be driven by a driving tool to rotate so as to translate rotational movement of said first drive head into linear movement of said first plunger to thereby displace said first needle segment, said second drive head being configured to be driven by the driving tool to rotate so as to translate rotational movement of said second drive head into linear movement of said second plunger to thereby displace said second needle segment.

9. The adjustable shock absorber according to claim 8, wherein the linear movement of said first plunger in response to the rotational movement of said first drive head is different from the linear movement of said second plunger in response to the rotational movement of said second drive head.

10. The adjustable shock absorber according to claim 8, wherein said micro-adjusting unit further has a first end cap and a second end cap, each of which is coupled to an outer end of a corresponding one of said first and second valve bodies, and each of which has an access hole configured to permit a corresponding one of said first and second drive heads to be mounted to a corresponding one of said first and second male threaded segments.

11. An adjustable shock absorber comprising:
a primary cylinder which defines a primary chamber for accommodating a working liquid and which has an upper end segment and a lower end segment, said lower end segment having an outlet port;
a main piston which is slidably disposed in said primary chamber to divide said primary chamber into an upper sub-chamber and a lower sub-chamber that are proximate to said upper and lower end segments, respectively, said main piston having a passageway interconnecting said upper and lower sub-chambers;
a shock rod connected to said main piston and extending outwardly of said primary cylinder to terminate at an impact side end;
an upper mounting seat mounted on said shock rod adjacent to said impact side end;
a lower mounting seat mounted on said primary cylinder proximate to said upper end segment;
a biasing member disposed between said upper and lower mounting seats to bias said impact side end away from said upper end segment;
a base having an inlet port disposed to be in fluid communication with said outlet port, and a first bore disposed downstream of said inlet port when the working liquid is forced by said main piston to flow out of said outlet port, said first bore having a first inner peripheral surface with a first female threaded region;
a base extension extending from said base to terminate at an end surface which has a central region and a circumferential region, said base extension having
a socket cavity which extends inwardly from said central region of said end surface, and which is in fluid communication with said inlet port,
a first internal port formed in said circumferential region of said end surface, and
a first duct extending from said first internal port toward said base to be in fluid communication with said first bore;
a valve module including
a module body which is fittingly engaged in said socket cavity, and which defines therein a flow-in passage and at least one flow-out passage, said flow-in and flow-out passages extending toward said base to be in fluid communication with said inlet port, and extending away from said base to terminate at a communication port and an outer valve port, respectively, said module body having
an inner valve seat which is disposed in said flow-in passage and which defines an inner valve port disposed to fluidly communicate said inlet port with said communication port, said inner valve port defining a port axis, and
at least one outer valve seat defining said outer valve port which is disposed radially offset from the port axis,
a check ball which is disposed in said flow-in passage, and which is configured to couple with said inner valve seat to permit a unidirectional flow of the working liquid into said flow-in passage through said communication port, and
a check diaphragm which is configured to couple with said outer valve seat to permit a unidirectional flow of the working liquid out of said flow-out passage through said outer valve port;
a secondary cylinder which defines a secondary chamber and which has an open end and a closed end, said open end being configured to permit said base extension to be fitted into and in liquid tight engagement with said open end;
a floating piston disposed slidably in said secondary chamber to divide said secondary chamber into a liquid sub-chamber and a gas sub-chamber for accommodating the working liquid and a working gas, respectively, said liquid sub-chamber and said gas sub-chamber being arranged such that when an impact force is exerted on said shock rod against a biasing force of said biasing member to force the working liquid to flow into said liquid sub-chamber, the working gas in said gas sub-chamber is compressed to generate a damping force to act on the working liquid so as to permit the working liquid in said liquid sub-chamber to flow back to said primary chamber through said communication port; and
a first needle valve disposed in said first bore and having a first valve seat defining a first valve port which is disposed to fluidly communicate said inlet port and said first duct, and a first plunger having a first needle segment and a first male threaded segment which is opposite to said first needle segment, and which is configured to be movably and threadedly engaged with said first female threaded region of said first bore such that said first needle segment is displaceable toward or away from said first valve seat so as to adjust the damping force.

12. The adjustable shock absorber according to claim 11, wherein said shock rod is hollow and has an inner peripheral surface with an inner female threaded region, said inner peripheral surface extending toward said lower end segment to terminate at a tubular end edge which defines a lower port in fluid communication with said lower sub-chamber, said inner peripheral surface having a through hole configured to fluidly communicate said upper sub-chamber and said lower port, said adjustable shock absorber further comprising an inner needle valve including:

an inner valve seat disposed on said inner peripheral surface of said shock rod, and defining an inner valve port disposed to fluidly communicate said through hole and said lower port; and an inner rod having an inner needle segment and an outer male threaded segment which is distal from said inner valve seat, and which is configured to be movably and threadedly engaged with said inner female threaded region such that said inner needle segment is displaceable toward or away from said inner valve seat so as to adjust the damping force.

13. The adjustable shock absorber according to claim 12, wherein:

said base further has a second bore disposed downstream of said inlet port when the working liquid is forced by said main piston to flow out of said outlet port, said second bore having a second inner peripheral surface with a second female threaded region; and said base extension further has a second internal port which is formed in said circumferential region of said end surface, and which is angularly displaced from said first internal port, and a second duct extending from said second internal port toward said base to be in fluid communication with said second bore, said adjustable shock absorber further comprising a second needle valve which is disposed in said second bore and which has a second valve seat defining a second valve port which is disposed to fluidly communicate said inlet port and said second duct, and a second plunger having a second needle segment and a second male threaded segment which is opposite to said second needle segment, and which is configured to be movably and threadedly engaged with said second female threaded region of said second bore such that said second needle segment is displaceable toward or away from said second valve seat so as to adjust the damping force.

14. The adjustable shock absorber according to claim 13, wherein said first and second needle valves have a first drive head and a second drive head, respectively, said first and second drive heads being mounted to said first and second male threaded segments, respectively, said first drive head being configured to be driven by a driving tool to rotate so as to translate rotational movement of said first drive head into linear movement of said first plunger to thereby displace said first needle segment, said second drive head being configured to be driven by the driving tool to rotate so as to translate rotational movement of said second drive head into linear movement of said second plunger to thereby displace said second needle segment.

15. The adjustable shock absorber according to claim 14, wherein the linear movement of said first plunger in response to the rotational movement of said first drive head is different from the linear movement of said second plunger in response to the rotational movement of said second drive head.

16. The adjustable shock absorber according to claim 11, wherein said module body defines a plurality of said flow-out passages each having said outer valve port, and has a plurality of said outer valve seats each defining said outer valve port, said outer valve ports of said module body being displaced from each other in a circumferential direction, said check diaphragm being configured in a ring shape so as to couple with all said plurality of outer valve seats.

17. The adjustable shock absorber according to claim 16, wherein said module body has a large-diameter segment, a small diameter segment, and a shoulder region which is defined between said large-diameter and small-diameter segments, and which has said outer valve seats, each of said large-diameter and small-diameter segments having an outer threaded region, said socket cavity having an inner peripheral surface with an inner threaded region which is threadedly engaged with said outer threaded region of said large-diameter segment, said small-diameter segment having said communication port, said check diaphragm being disposed on said shoulder region, said valve module further including a nut engaged threadedly with said outer threaded region of said small-diameter segment so as to permit said check diaphragm to be brought into coupling engagement with all said plurality of outer valve seats.

18. The adjustable shock absorber according to claim 11, wherein said base extension has an outer threaded surface, said secondary cylinder having an inner peripheral surface which defines said secondary chamber, and which has an inner thread region that is proximate to said open end, and that is threadedly engaged with said outer threaded surface of said base extension.

19. The adjustable shock absorber according to claim 11, further comprising a duct body which is disposed in said lower sub-chamber and which has an internal duct disposed upstream of said outlet port when the working liquid is forced by said main piston to flow out of said outlet port, and a duct port disposed to fluidly communicate said lower sub-chamber with said internal duct.

* * * * *